United States Patent [19]

Lund et al.

[11] 3,994,866

[45] Nov. 30, 1976

[54] AMINOALKYLATING POLYMER CONTAINING PLURALITY OF —CO—NH— AMIDE GROUPS AS INTEGRAL PARTS OF MAIN POLYMER CHAIN

[75] Inventors: Eric D. Lund, Winter Haven, Fla.; Ben J. Lipps, Jr., Concord, Calif.

[73] Assignee: The Dow Chemical Company, Midland, Mich.

[22] Filed: Aug. 24, 1972

[21] Appl. No.: 283,398

Related U.S. Application Data

[63] Continuation-in-part of Ser. No. 767,528, Oct. 14, 1968, abandoned.

[52] U.S. Cl. .................. 260/78 SC; 210/500 M; 260/77.5 A; 260/77.5 C; 260/77.5 CH; 260/78 A; 260/78 L; 428/474
[51] Int. Cl.$^2$ ............................................ C08G 69/48
[58] Field of Search .............. 260/78 R, 78 A, 78 L, 260/78 SC, 77.5 A, 77.5 C, 77.5 CH

[56] References Cited
UNITED STATES PATENTS

| | | | |
|---|---|---|---|
| 2,130,948 | 9/1938 | Carothers | 260/78 R |
| 2,241,321 | 5/1941 | Schlack | 260/78 L |
| 2,765,294 | 10/1956 | England | 260/78 R |
| 2,855,267 | 10/1958 | Zimmerman | 260/78 R |
| 3,157,595 | 11/1964 | Johnson et al. | 260/78 SC |
| 3,242,128 | 3/1966 | Chalmers | 260/78 TF |
| 3,247,165 | 4/1966 | Rodia | 260/78 TF |
| 3,299,010 | 1/1967 | Samour | 260/78 UA |

OTHER PUBLICATIONS

Korshak et al., Synthetic Hetero–Chain Polyamides, 1964, pp. 264–268, 270–272, 274, 277–281, 288, 297–299.

Polymer Reviews, No. 10, Condensation Polymers by Interfacial and Solution Methods, 1965, pp. 187–190, 193, 198, 201, 203, 208, Morgan.
Kirk–Othmer, Encyclopedia of Chemical Technology, 2nd Edition, vol. 16, 1968, pp. 14–22.
Korshak–Frunze, Synthetic Hetero–Chain Polyamides, 1964, pp. 265–267, 269, 279, 280, 288, 316–322, 344.
Lee et al., New Linear Polymers, 1967, pp. 133, 134, 139, 153, 154, 161, 173, 176.

*Primary Examiner*—Harold D. Anderson
*Attorney, Agent, or Firm*—Ralph M. Mellom

[57] ABSTRACT

A process for aminoalkylating a polymer containing a plurality of

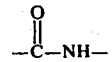

amide groups as integral parts of the main polymer chain is described wherein aminoalkyl groups pendant from said amide groups are formed. The process comprises (a) swelling the polymer, such as Nylon 6, in an acidic swelling agent such as aqueous formic acid; (b) immersing the swollen polymer in a liquid alkylenimine bath such as ethylenimine; (c) heating the alkylenimine treated polymer from about 70° to 140° C; and (d) recovering the polymer from the swelling agent, unreacted alkylenimine, etc. The heating step is preferably done in an atmosphere of the alkylenimine.

1 Claim, No Drawings

AMINOALKYLATING POLYMER CONTAINING PLURALITY OF —CO—NH— AMIDE GROUPS AS INTEGRAL PARTS OF MAIN POLYMER CHAIN

REFERENCES

This application is a continuation-in-part application of our copending application Ser. No. 767,528 filed on Oct. 14, 1968 and now abandoned.

BACKGROUND OF THE INVENTION

This invention relates to chemical modification of polymers to impart cationic properties thereto. More particularly it relates to chemical modification by aminoalkylation of amido groups,

contained in the main chain of the polymer.

Methods are constantly being sought to impart hydrophilic, cationic properties to polymeric substances for a variety of purposes. One of the most obvious routes has been to form the polymer, at least in part, from a polymerizable, cationic monomer such as vinyl pyridine, dimethylaminoethyl methacrylate, etc. However, few such monomers are commercially available and they usually are expensive. The other drawback to this route is that it is not possible to modify only the surface of the polymer or the article prepared therefrom.

Among the methods of interest to modify a polymeric material has been the reaction of ethylenimine and the like with the polymer either in solution, etc., to homogeneously modify it or with an article thereof to modify the surface only. However, ethylenimine is a highly reactive chemical which under acid catalysts prefers to react with itself to form polyethylenimine rather than to react with the polymer to any significant extent. Due to the commercial availability now of ethylenimine and propylenimine it would be desirable to have a method which utilizes ethylenimine, etc. to impart cationic properties to polymeric materials.

SUMMARY OF THE INVENTION

Accordingly, this invention is directed to a process for chemically modifying a polymer. More particularly it is directed to an aminoalkylation reaction with polymers which contain a plurality of

amide groups in the main chain of the polymer. Further the invention is directed to a process for converting said polymers fabricated into membranes or hollow fibers from a water impermeable, hydrophobic state to a water permeable hydrophilic state. Additionally, the invention contemplates enhancing the ability of said polymers to retain anionic agents such as dyes, anticoagulants, and the like. Also, the invention contemplates the preparation of an artificial kidney utilizing hollow fibers modified to be water permeable and to have cationic properties according to the process of this invention and to have thrombogenic inhibiting properties by adsorbing an anti-coagulant having anionic groups, such as herparin, to said modified polymer.

The process comprises, in combination, the following steps: (a) swelling the polymer by an acidic swelling agent therefor; (b) immersing the swollen polymer in a liquid alkylenimine; and (c) heating said alkylenimine treated polymer to cause reaction between said amide groups and the alkylenimine and to provide pendant polyaminoalkyl groups. Advantageously, the extent of aminoalkylation of the polymer is increased by heating the alkylenimine treated polymer in an atmosphere of alkylenimine. The polymer may then be recovered by removing the swelling agent, unreacted alkylenimine, etc. which remains after the heating step.

DETAILED DESCRIPTION OF THE INVENTION

The polymeric materials which may be modified according to the process of this invention includes those polymers having a plurality of

amide groups in the main chain of the polymer. Typical polymers include polyamides, polyurethanes, polyureas and the like with polyamides being a preferred class of polymers.

Polyamides are condensation products which contain recurring amide groups,

as integral parts of the polymer backbone (or main polymer chain). Generically, polyamides are also referred to as "nylons." The polyamides may be prepared by condensation of amino acids (more usually the lactams such as caprolactam), by condensation of dibasic acids and diamines, by condensation of diamines and diacyl chlorides and the like. Polyamides and methods for their preparation are well known, e.g. see Encyclopedia of Polymer Science and Technology, Vol. 10, p. 483 (Interscience Publishers) or Encyclopedia of Chemical Technology, 2nd Edition, Vol. 16, p. 1 (Interscience Publishers). Polyurethanes involve the reaction of a polyisocyanate and a polyol such as toluene diisocyanate and a glycol. Polyureas include products prepared from a polyisocyanate and a diamine. The preparation of a variety of polyamides, polyurethanes and polyureas is described in Polymer Reviews No. 10, "Condensation Polymers by Interfacial and Solution Methods" by P. W. Morgan, Interscience Publishers, 1965 on pages 163–253 (polyamides and polyureas) and on pages 261–300 (polyurethanes) and is incorporated herein by reference. All the above polymers are similar in that they contain recurring amide groups,

as an integral part of the main polymer chain.

Aminoalkylating agents include alkylenimines having the formula

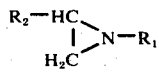

wherein $R_2$ is H or a methyl group and $R_1$ is H or an alkyl group of 1 to 3 carbon atoms. Suitable alkylenimines include ethylenimine, propylenimine, N-ethyl ethylenimine, N-propyl propylenimine and the like. Ethylenimine and propylenimine are preferred.

Aminoalkylation of polymeric materials according to this invention comprises the following steps: (a) swelling of the polymeric material by an acidic swelling agent; (b) immersing said swollen polymeric material in a liquid alkylenimine bath; and (c) heating said alkylenimine treated polymer to produce pendant polyaminoalkyl groups by reaction of the alkylenimine with said amide groups. The aminoalkylated polymer may then be recovered by removing the swelling agent, excess alkylenimine, etc. Higher degrees of aminoalkylation may be obtained in step (c) by heating in an atmosphere of said alkylenimine.

The first step of the process involves treating the polymeric material with any acidic agent capable of swelling the polymer without dissolving it or degrading it. Said acidic agent also serves as a catalyst for the aminoalkylation reaction. Consequently, the swelling agent may be a single acidic compound or it may be a solution of an acid catalyst in a solvent which is capable of swelling the polymer and which is also capable of dissolving the the alkylenimine but is unreactive with said alkylenimine.

Suitable acidic agents include formic acid, p-toluene sulfonic acid, sulfuric acid, phosphoric acid, boron trifluoride, phenol, substituted phenols, polyhydric phenols such as cresol, substituted polyhydric phenols and the like. Suitable solvents include water, alcohol, acetates, aromatic solvents such as benzene, toluene, etc., chlorinated solvents such as methylene chloride, carbon tetrachloride and the like. It should be apparent that a wide variety of acidic swelling agents may be used and the choice of a particular agent depends on the nature of the polymer and is readily determined from known swelling characteristics of the polymer in various solvents. Particularly useful swelling agents include aqueous formic acid solutions, alcohol solutions of m-cresol, solutions of phenol in chlorinated hydrocarbons or dimethylformamide and the like.

The time required for swelling the polymer depends on the thickness or physical state of the polymer as well as the swelling agent. Thin films, for example, may require only a minute or two, whereas thicker articles may require 24 hours or even more. Generally, a short swelling time is preferred for reason of process economics. The temperature employed during the swelling step is not particularly critical and ranges between the inherent limiting temperatures such as the freezing or boiling points of the swelling agent, polymer characteristics, etc. Preferably, temperatures of from 25°–90° C are employed to accomplish swelling at a practicable rate.

The swollen polymer, preferably with excess swelling agent removed, is then immersed in a liquid alkylenimine bath maintained at a temperature below about 25° C, preferably at 0° to 10° C. The alkylenimine may be diluted with an inert solvent but it is preferred to use undiluted alkylenimine to obtain as high a concentration of alkylenimine in the swollen polymer as possible. The lower temperatures are employed to minimize premature polymerization within the polymer and polymerization in the bath. Usually from about 15 minutes to an hour is sufficient to ensure good penetration of the alkylenimine into the polymer which is important when it is desired to obtain in-depth aminoalkylation and provide permeability characteristics. Longer times are operable but tend to result in leaching of the swelling agent.

Aminoalkylation of the polymer is then accomplished by heating from about 70° to 140° C. To minimize loss of the alkylenimine by volatilization, the heating is preferably done in an alkylenimine atmosphere. The heating time may range from as little as ¼ hour to 100 hours depending on the catalyst, etc. Usually a time of about 3 to 24 hours is sufficient to substantially complete the aminoalkylation reaction. Preferably the reaction time is kept to a minimum to avoid any possible undesirable effects due to the temperature or other competing reactions.

The aminoalkylated polymer may then be recovered by removing the swelling agent, unreacted alkylenimine, soluble reaction by-products, etc. by such techniques as evaporation under a vacuum, leaching with water or preferably by an acid wash followed by a water wash. The latter method is advantageously used when it is desired to have the aminoalkylated polymer in a protonated form. A wide variety of acids may be used but oxidizing acids such as nitric, perchloric, etc. are undesirable due to the presence of oxidizable groups in the polymer.

The process of this invention produces cationic polymers having aminoalkyl groups pendant from the amide groups. The aminoalkylated polymer may be further treated with various anionic materials for retention by the polymer or at least on the surface of the polymeric article. Anionic materials include dyes, textile treating chemicals such as sizing agents, anti-coagulants such a heparin and the like which provide blood coagulation inhibiting properties of value in the preparation of artificial hollow fiber kidneys or other prosthetic devices.

Advantageously, the process of this invention may be used with hollow fibers useful in preparing artificial kidneys and may be used to impart permeability or increase the permeability of said hollow fibers. Dye retention is greatly improved by aminoalkylation of the surface of a fiber followed by reaction with anionic dyes. Those skilled in the art will recognize many other purposes for which said aminoalkylated polymer may be used.

The invention is further illustrated by the following non-limiting examples.

EXAMPLE 1

A series of aminoethylated polyamides were prepared by swelling the polyamide in the acidic swelling agent indicated for ½ hour at room temperature. After removing excess agent the polyamide was immersed in liquid ethylenimine at 0°–10° C for ½ hour and then placed in an atmosphere of ethylenimine at 80°–85° C at 1 atm. for three hours. After the reaction the aminoethylated polyamide was soaked in a 10% HCl bath for 2 hours, washed and dried. The amount of amine nitrogen was determined indirectly by analyzing for the percent Cl⁻ in the polymer. The results are shown below:

| Polyamide | Swelling Treatment | Wt. % Chloride |
|---|---|---|
| Nylon 6 melt spun fibers (Zytel 211) | none | 0 |
| " | 1% aq. formic acid | 0 |
| " | 10% aq. formic acid | 2.1 |
| " | 30% aq. formic acid | 3.7 |
| " | 50%[1] aq. formic acid | 3.0 |
| " | 50%[2] aq. formic acid | 2.8 |
| " | 3 pts m-cresol to 2 pts methanol, by vol | 0.8 |
| Nylon 6, pellets (Zytel 211) | 50% aq. formic acid | 2.3 |
| Nylon 66, pellets (Zytel 42) | 50% aq. formic acid | 0.4 |

[1] Concentrations more concentrated than 60% dissolve the polymer.
[2] Heated in a $N_2$ atmosphere instead of ethylenimine.

Melt spun Nylon 6 hollow fibers were treated with ethylenimine according to the previous examples and the aminoethylated fibers were fabricated into a dialyzing unit which was tested under simulated hemodialysis conditions. A urea solution was pumped through the lumen of the fibers and a dialysate solution, free of urea, circulated around the outside of the fibers. The overall dialyzer permeability was calculated from the difference in the inlet and outlet urea concentrations to be $3.3 \times 10^{-2}$ cm/min. For comparison a 1 mil (dry) cellophane film has a urea permeability of $3.2 \times 10^{-2}$ cm/min. Thus, it can be seen that a normally water impermeable hollow polyamide fiber was converted to a fiber having a urea permeability comparable to cellophane.

Anti-thrombogenic properties are imparted to the above aminoethylate Nylon 6 hollow fiber by circulating a solution of sodium heparin through the lumen of the fibers wherein the heparin is absorbed onto the interior surface of the fiber.

EXAMPLE 2

Similarly, a 1 mil thick polyurethane membrane prepared from ethylene di-isocyanate and 1,3-propylene glycol is swollen by immersion for 20 minutes at 25% in a 1% by wt. solution of $BF_3$ in methylene chloride, then rinsed with diethyl ether and soaked in liquid ethylenimine at about 10° C for ½ hour. The membrane is then placed in a ethylenimine atmosphere at about 80° C for 5 hours followed by washing with 10% aq. HCl until free of unreacted ethylenimine and then rinsed and dried. By analysis the number of ethylenimine units reacted per urethane repeating unit is calculated to be greater than 0.1. Similar results are obtained if propylenimine is used in place of ethylenimine.

EXAMPLE 3

A Tow of melt-spun fibers of polydecamethylene urea is swollen in a 3 percent solution of m-cresol in toluene for 1 hour at 50° C, rinsed once in pentane and soaked in ethylenimine overnight at 10° C. The fibers are held at a temperature of 75° C in a gaseous mixture of ethylenimine and nitrogen (3:1 by volume) for 10 hours, washed with 10% aq. HCl and then water washed and dried. Analysis of the fibers shows an amine content corresponding to the reaction of more than one ethylenimine unit per 10 repeating units of the polyurea.

What is claimed is:
1. A process for aminoalkylating a polymer having a plurality of

amide groups as an integral part of the main polymer chain which comprises
 a. swelling said polymer with an acidic agent which is capable of swelling said polymer without dissolving or degrading it,
 b. immersing said swollen polymer in a liquid alkylenimine maintained at a temperature below about 25° C,
 c. heating said alkylenimine treated polymer from about 70° to 140° C for a time sufficient to form aminoalkyl groups pendant from said amide groups, and
 d. recovering the aminoalkylated polymer.

* * * * *